United States Patent [19]
Gabr

[11] 4,379,951
[45] Apr. 12, 1983

[54] ELECTRO-ACOUSTIC TRANSDUCER MEANS

[76] Inventor: Saad Z. M. Gabr, 81 Old Dover Rd., Canterbury, Kent, England

[21] Appl. No.: 94,082

[22] Filed: Nov. 14, 1979

Related U.S. Application Data

[62] Division of Ser. No. 901,147, Apr. 28, 1978, Pat. No. 4,176,253.

[30] Foreign Application Priority Data

| Apr. 20, 1977 | [GB] | United Kingdom | 16500/77 |
| Apr. 25, 1977 | [GB] | United Kingdom | 17215/77 |
| May 20, 1977 | [GB] | United Kingdom | 21383/77 |
| Jun. 1, 1977 | [GB] | United Kingdom | 23208/77 |
| Jan. 23, 1978 | [GB] | United Kingdom | 2629/78 |

[51] Int. Cl.³ .................... H04R 7/02; H04R 9/02
[52] U.S. Cl. .................... 179/101; 179/115.5 R; 179/116; 179/181 R; 181/161; 181/163; 181/165; 181/173
[58] Field of Search ............ 179/108 R, 115.5 DV, 179/115.5 H, 115.5 ME, 115.5 PV, 115.5 R, 181 R, 181 F, 115.5 PS, 116, 101; 181/157–174

[56] References Cited

U.S. PATENT DOCUMENTS

| 501,610 | 7/1893 | Brown | 179/108 R |
| 1,273,459 | 7/1918 | Chudzikowski | 181/163 |
| 1,690,840 | 11/1928 | Round | 181/172 |
| 1,718,357 | 6/1929 | Hutchison | 179/108 R |
| 1,760,085 | 5/1930 | Plumb | 181/163 |
| 1,868,019 | 7/1932 | Minton et al. | 179/116 |
| 2,034,882 | 3/1936 | Scribner | 179/115.5 R |
| 2,534,040 | 12/1950 | Lindley | 179/115.5 ME |
| 2,551,556 | 5/1951 | Brennan | 179/115.5 DV |
| 3,201,529 | 8/1965 | Surh | 179/115.5 ME |
| 3,509,290 | 4/1970 | Mochida et al. | 179/181 F |
| 3,821,492 | 6/1974 | Tamura et al. | 179/116 |
| 3,943,304 | 3/1976 | Piribauer | 179/115.5 PS |

FOREIGN PATENT DOCUMENTS

| 905370 | 7/1962 | France | 179/115.5 R |
| 411781 | 6/1945 | Italy | 179/108 R |
| 312756 | 6/1929 | United Kingdom | 179/115.5 R |
| 312950 | 6/1929 | United Kingdom | 179/115.5 ME |

*Primary Examiner*—George G. Stellar
*Attorney, Agent, or Firm*—Young & Thompson

[57] ABSTRACT

An electro-acoustic transducer has a planar annular diaphragm suspended at both the inner and outer periphery. The transducer component is situated within the inner periphery and interacts with the diaphragm via outwardly extending connections.

2 Claims, 41 Drawing Figures

ELECTRO-ACOUSTIC TRANSDUCER MEANS

This is a division of application Ser. No. 901,147, filed Apr. 28, 1978, now U.S. Pat. No. 4,176,253.

The invention relates to electro-magnetic-acoustic transducers.

Conventionally, electro-magnetic-acoustic transducers comprise a diaphragm assembly (which will hereinafter be referred to for brevity merely as a diaphragm) provided with a tubular former on which a voice coil is wound, the diaphragm being mounted in a chassis to which a permanent magnet structure is fixed. The magnet structure provides an annular gap within which the voice coil is received. The transducer can be regarded as comprising a diaphragm, a chassis, and an electro-mechanical transducer consisting of the voice coil and the former and the magnet structure. If the transducer is used as a loudspeaker, electrical energy is supplied to the voice coil to cause this to move axially together with the diaphragm, the movement of which generates sound vibrations. If used as a microphone, sound vibrations cause the diaphragm to move so that the voice coil moves also and develops electrical energy in a circuit connected to the microphone terminals.

The structure of such electro-acoustic transducers imposes limitations on the accuracy with which an electrical input signal is converted to sound when the transducer is used as a loudspeaker. Thus because the electro-mechanical transducer acts centrally there is a tendency for the diaphragm to change its configuration under the mechanical stresses developed as it moves in response to the electro-mechanical transducer drive, particularly due to signals of complex frequency composition.

It is the major object of the invention to provide an improved electro-acoustic transducer adapted to allow large piston-like excursions of the diaphragm and in linear relationship with the applied electrical signal during any one cycle and further adapted to cause minimal physical deformation of the diaphragm during such excursions, particularly at high power.

The invention also has as an object the provision of an electro-acoustic transducer in which the drive from electro-mechanical transducer means is applied to a diaphragm in a manner which minimizes distortion of the diaphragm.

The invention also has as an object to provide an electro-acoustic transducer unit in which harmonic distortion due to changes of diaphragm configuration is substantially reduced as compared with conventional units, with an improvement in particular in the reproduction of the lower frequency end of the audio range.

Another object of the invention is to provide an electro-acoustic transducer in which the efficiency of the energy conversion shows a substantial improvement over conventional units, and in which there are provided separate diaphragm surfaces adequate to give special response to specified frequency ranges, the transducer having better dynamic characteristics than conventional units, by improvements in magnetic damping of the respective diaphragms.

A further object of the invention is to provide a loudspeaker unit with improved power handling capacity per unit area of the overall area of the loudspeaker chassis, as compared with conventional units.

Yet another object of the invention is to provide electro-acoustic transducer units capable of effecting a substantial reduction in manufacturing costs, as compared with conventional units, as well as a reduction in costs per unit of power handled by units of the invention.

These and other objects and advantages of the present invention will be more readily understood from the following description, which is given for purposes of illustration and not by way of limitation, taken in connection with the accompanying drawings, in which.

Figures 1, 2, 3, 4, 5:
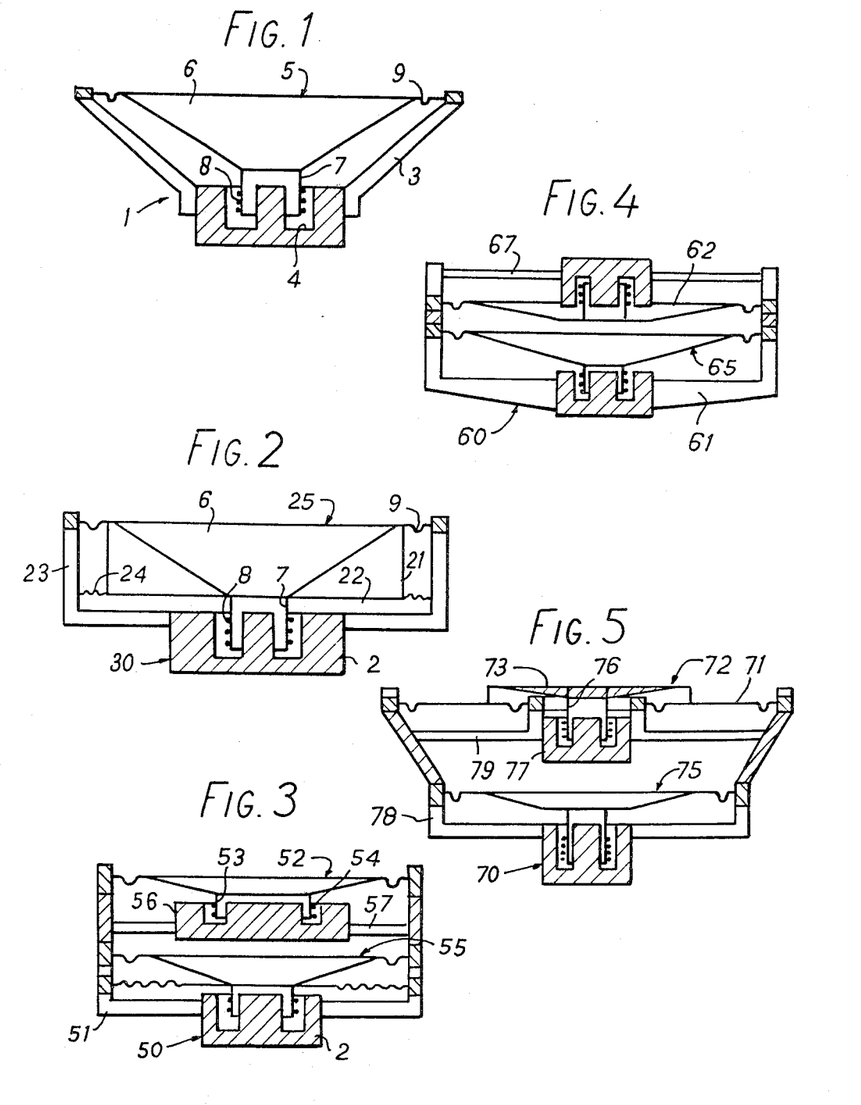
FIG. 1 is a schematic sectional side view of a conventional moving coil electro-acoustic transducer according to the prior art.
FIGS. 2 to 5 and 14 are schematic sectional side views of respective moving coil electro-acoustic transducers embodying the present invention, the diaphragms of each of the embodiments of FIGS. 3, 4 and 14 being pneumatically coupled.

The conventional electro-acoustic transducer 1 shown in FIG. 1 comprises a permanent magnet 2 or permanent magnet assembly rigidly secured to a chassis 3. The magnet 2 has an annular recess 4 on one side and the chassis 3, which has the form of a generally frusto-conical open frame, diverges away from this side of the magnet 2 to surround and support a diaphragm assembly 5 comprising a main diaphragm portion 6 of frusto-conical form, with a tubular voice coil former 7 extending from its smaller diameter end. The former 7 supports an external voice coil 8 wound around it. The diaphragm assembly 5 is mounted in the chassis 3 by suspension means comprising an annular diaphragm with an annular groove 9 extending between the larger diameter end of the frusto-conical diaphragm 6 and the outer edge of the chassis 3. The mounting arrangement is such that the voice coil 8 is received with clearance in the annular recess in the magnet 2. The suspension means includes a further corrugated annular diaphragm or centering means (not shown) extending between the permanent magnet 2 and the diaphragm assembly 5 conveniently at about the joint between the diaphragm 6 and the former 7.

As is well known, an electric current in the voice coil 8 will cause the diaphragm assembly 5 to move axially under the restraint imposed by the suspension means so that the transducer acts as a loudspeaker motor unit. The transducer can instead operate as a microphone, because movement of the diaphragm assembly due to sound vibrations impinging on it will induce a current in the voice coil 8.

In the following description, parts of the transducers embodying the invention which correspond to the numbered parts of the conventional transducer of FIG. 1 are indicated by the same reference numerals as are used to identify those parts in FIG. 1.

In the electro-acoustic transducer device embodying the invention shown in FIG. 2, the diaphragm assembly 25 is reinforced by an outer sleeve 21, which extends concentrically with the former 7 away from the joint of the diaphragm 6 and the suspension 9 towards the magnet 2. The sleeve 21 joins the outer periphery of an annular disc 22 also forming part of the diaphragm assembly 25, the inner edge of which is secured at the joint of the diaphragm 6 and the former 7. The diaphragm assembly 25 can be additionally suspended as shown by an annular, annularly corrugated, suspension element 24 extending between the joint of the sleeve 21 and the disc 22 and the chassis 23. The chassis 23 has a sleeve-like coaxial portion around the sleeve 21 to accommodate the extra elements 21, 22 of the diaphragm assembly 25.

It will be evident that the diaphragm assembly 25 is effectively rigidified by the addition of the sleeve 21 and disc 22, so that the tendency for deformation of the diaphragm assembly between the drive and the voice coil 8 and the suspension 9 is resisted. The annular volume of triangular radial section defined between the diaphragm 6, the sleeve 21 and the disc 22 can be sealed or the sleeve and disc apertured; the volume can be filled or partially filled with foamed plastic or other suitable material.

FIG. 3 discloses a transducer device 50 in accordance with the present invention having a diaphragm assembly 55 which may be of conventional form suspended in a chassis 51 and arranged to be driven by means of an electro-mechanical transducer comprising a permanent magnet 2 having in an annular recess thereof a voice coil carried by a former constituting part of the diaphragm assembly. The transducer 51 has a radiating diaphragm 52 also suspended in the chassis 51 as to extend parallel to the diaphragm assembly 55 and to form therewith, and with a wall portion of the chassis 51, a sealed chamber. The diaphragm assembly 52 has a former 53 carrying a voice coil 54. The voice coil is received in an annular recess in a permanent magnet 56 which is mounted within the sealed chamber by means of a plurality of radially extending rods or like supports 57. The electro-mechanical transducer constituted by the coil 53 and the magnet 56 is not intended to drive the diaphragm assembly 52 in use of the transducer as a loudspeaker, but to provide an output signal when the diaphragm assembly 52 moves in the chassis under pressure variations within the sealed chamber due to driven movements of the diaphragm assembly 55. The resulting electrical output in the coil 53 can be applied to damp the movement of the diaphragm assembly 52 and/or that of the diaphragm assembly 55, this assembly carrying an auxiliary coil within, around, or axially adjacent the regular voice coil 8 to receive a signal for this purpose. The electrical output can be employed in addition and/or instead to drive a further diaphragm. The use of such signals in these ways is explained in more detail below. It is to be understood that in any transducer device embodying the present invention and including a pneumatically driven diaphragm, this can carry a coil forming part of an electro-mechanical transducer to provide an output when the transducer is used as a loudspeaker.

The transducer of FIG. 3 has the electro-mechanical transducer for the diaphragm 52 within the sealed chamber between the driven and the output diaphragm assemblies, but the electro-mechanical transducer can be placed externally if desired as shown in FIG. 4, to reduce the volume of the sealed chamber. As shown in FIG. 4, a transducer 60 has an internal diaphragm assembly 65 and an additional diaphragm 62, with a sealed chamber defined by the two diaphragms and solid wall portion of the chassis 61, which is otherwise of open frame construction. The diaphragm assembly 62 carries a former 63 with a voice coil 64 cooperating with a magnet 66, suspended on a preferably small number of arms 67 extending radially between the magnet 66 and the chassis 61. The diaphragm assembly 65 has a concave surface forming a wall of the chamber, and in order to minimize the volume of this, the assembly 62 has a convex external surface forming the opposite wall of the chamber.

Diaphragm 62 is provided with at least one coil 68 of at least one turn, and preferably of a plurality of turns, of non-magnetic material such as copper or aluminum. The coil 68 is mounted coaxially with the voice coil 64 and provides magnetic control of suspension and magnetic damping; the coil thus serves to reduce distortion and smooth the frequency response characteristics of the transducer output. The coil also acts as a means to alter the resonant frequency of the diaphragm and to improve the efficiency of the reproduction of low notes.

The or each coil 68 can be short circuited or otherwise electrically loaded. Coils such as the coil 68 can be added to transducers, which may be in other respects conventional after manufacture has been otherwise completed. Thus the characteristics of otherwise similar transducers can be readily selectively altered subsequent to completion of the normal manufacturing processes by the addition of one or more such coils as the coil 68.

Also in accordance with the invention, a transducer can be provided with a disc or plate or non-magnetic material such as copper or aluminum, instead of or as well as the coil 68 and preferably at approximately the same position on the diaphragm. Thus the transducer 65 of FIG. 4 can be provided with a non-magnetic metal disc 69, on the diaphragm. Such a disc acts as a hysterisis brake.

In the further transducer device embodying the present invention shown in FIG. 5, a transducer 70 again has a motor diaphragm assembly 75 pneumatically coupled to a radiating diaphragm assembly 72. The radiating diaphragm assembly 72 is however of a relatively complex structure, comprising an annular portion 71 and a central circular portion 73. The central portion 73 is greater in diameter than the central aperture of the annular portion 71, and is secured to the portion 71 concentrically. The circular portion 73 carries a voice coil former 76 forming part of an electro-mechanical transducer including a magnet 77 mounted within a chassis 78 of the transducer by means of radial arms 79. The electro-mechanical transducer of the electro-acoustic transducer 70 can of course be arranged externally of the sealed chamber between the diaphragm assemblies 72 and 75 if preferred, after the manner of the transducer 60 of FIG. 4.

The transducer device 90 schematically shown in FIGS. 6 and 7 again has a motor diaphragm assembly 95 mounted in a chassis 91 and forming a sealed chamber with a solid wall portion of the chassis and a diaphragm assembly 92 which provides a radiating surface. As with the transducer 70 of FIG. 5, the radiating diaphragm assembly 92 comprises a circular central portion 93 and an annular outer portion 94. The central portion 93 is associated with an electro-mechanical transducer including a magnet 96 carried within the sealed chamber by radial bars 97 extending from the chassis wall. The annular diaphragm 94, instead of being passive as in FIG. 5 is an active additional radiator, being itself associated with electro-mechanical transducer means. Instead of a single such means, six are provided, equiangularly spaced around the diaphragm 94. The radial bars 97 support the magnets 98 of these outer electro-mechanical transducers which include a voice coil former 99.

Figure 7:
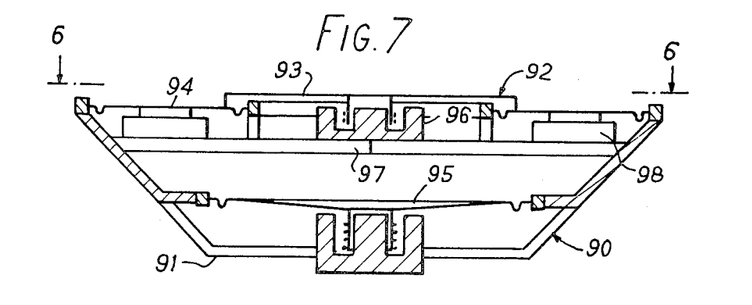
Figure 8:
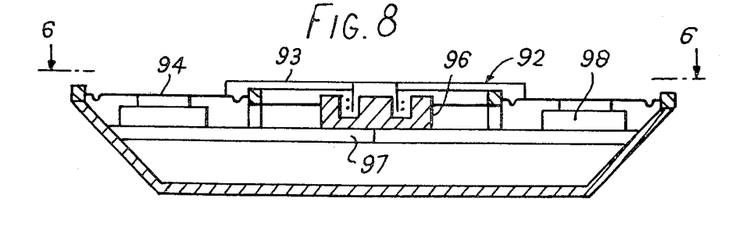

FIG. 8 is similar to FIG. 7, but shows the transducer device without the chassis 91 and diaphragm assembly 95.

Figure 6:
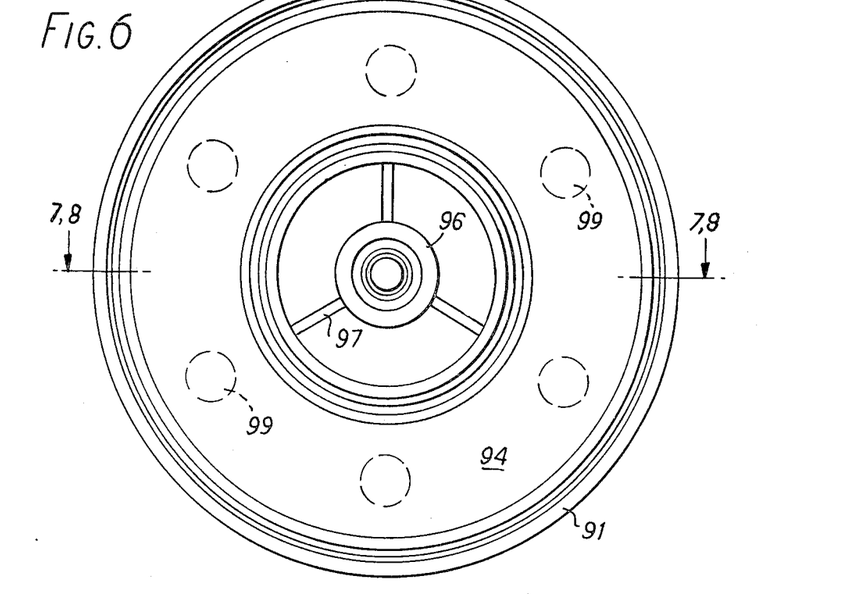
FIG. 6 is a schematic front view of the transducers shown in FIGS. 7 and 8, which latter Figures are cross-sections thereon showing two different embodiments.
Figure 9:
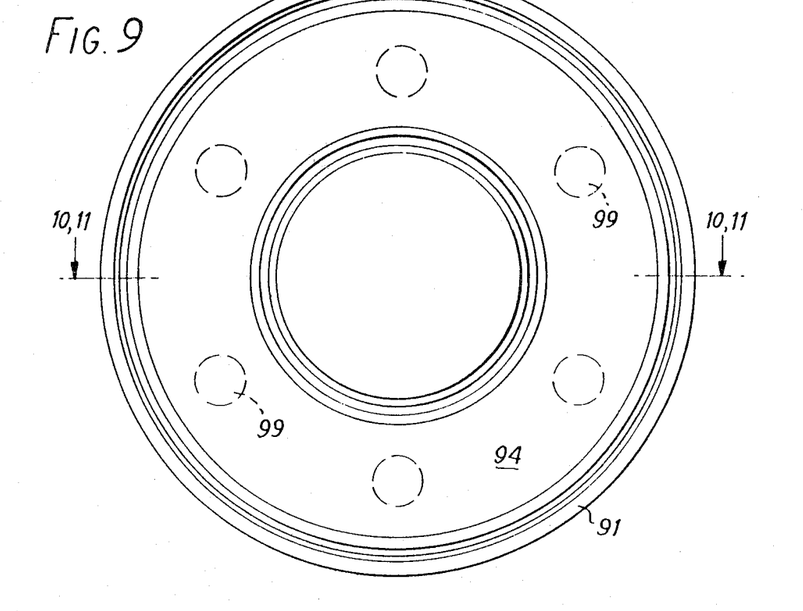
FIGS. 9, 10 and 11 are views similar to FIGS. 6–8 but showing further embodiments.
Figure 10:
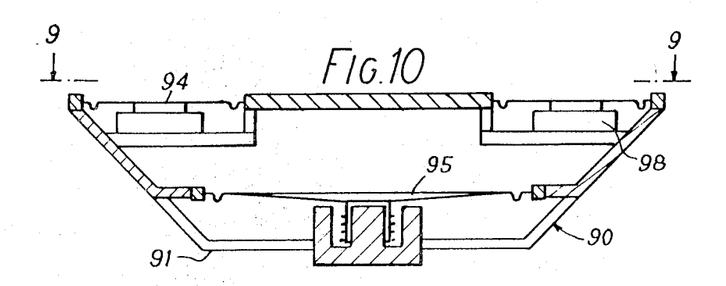
Figure 11:
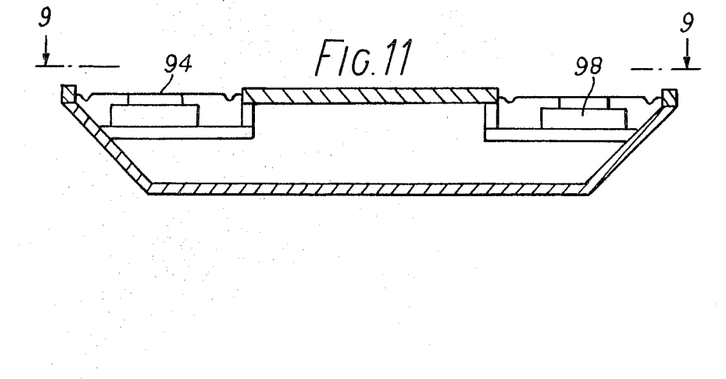
Figure 12:
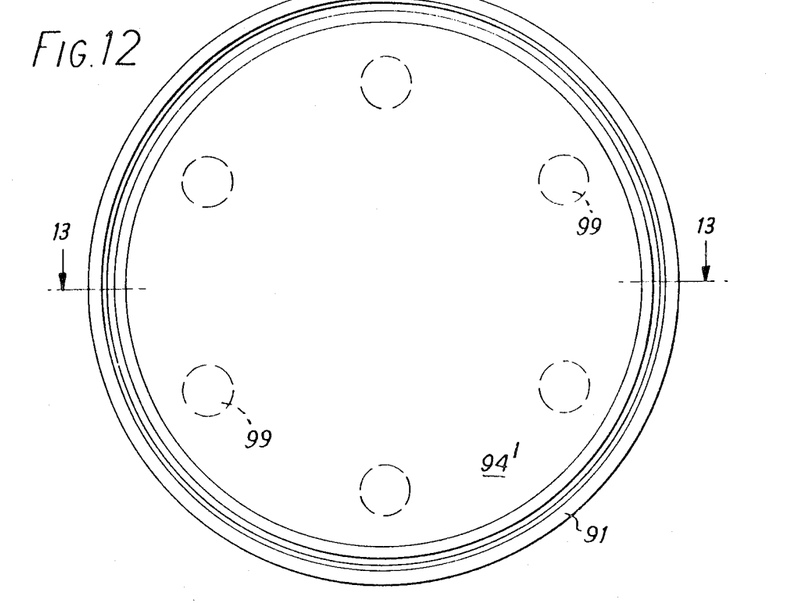
FIGS. 12 and 13 are views similar to FIGS. 9 and 10 but showing still another embodiment.
Figure 13:
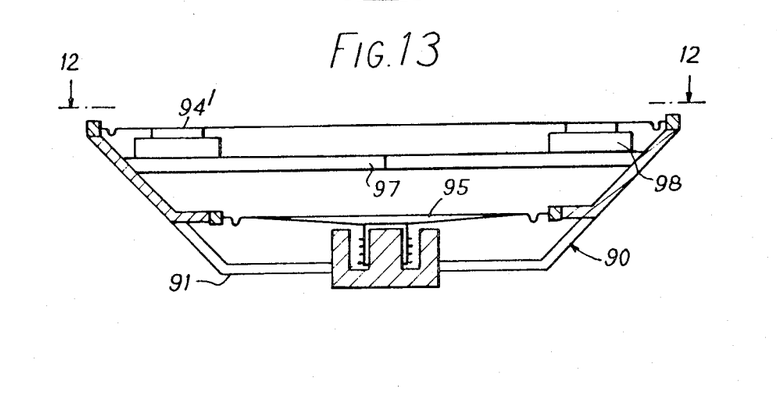

The devices of FIGS. 6 to 8 can of course be modified by the omission of the electro-mechanical transducer with the magnet 96, as shown in FIGS. 9 to 11. Alternatively, as shown in FIGS. 12 and 13, annular diaphragm 94 can be replaced by a plain circular diaprhagm 94'.

The central aperture of the annular diaphragm 94 can be occupied by a radiating diaphragm which is suspended in the chassis 91 separately from the annular diaphragm. The annular diaphragm can then be divided along two or more radial lines into two or more independently suspended part-annular diaphragms. Of the plurality of radiating diaphragms thus provided all or less than all can be either passive or associated with one or more electro-acoustic transducers.

Figure 14:
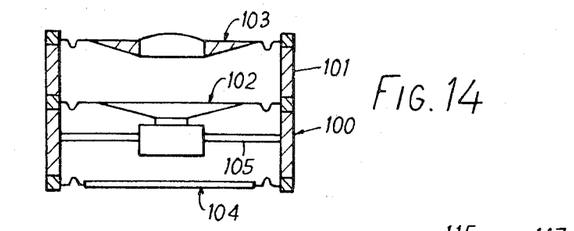

The transducer 100 shown in FIG. 14 has a generally cylindrical chassis 101 which mounts a motor diaphragm assembly 102 concentrically within it. The assenbly 102 forms a sealed chamber with the inner surface of a second transducer assembly 103, and the wall of the chassis. The diaphragm assembly 103 has a central portion with an externally domed shape. Instead of exposing the outer surface of the diaphragm assembly 102 to the interior of an enclosure for the transducer, this surface also defines a sealed chamber defined by a further transducer assembly 104, also suspended in the chassis 101. The electro-mechanical transducer of the diaphragm assembly 102 is supported on radial rods 105 from the chassis wall. Although both the radiating diaphragm assemblies 103 and 104 are shown as passive assemblies, one or both may if preferred be used as an active radiator assembly by the securement thereto of one or more voice coil formers forming part of an electro-mechanical transducer, the output of which can be applied to damping or control of the assembly or of one or both of the others in the transducer 100.

It will be evident that the chassis 101 can be regarded as an enclosure for a loudspeaker unit comprising the motor diaphragm assembly 102 and either one of the radiating diaphragms 103 and 104, the other of these radiating diaphragms functioning as an additional radiator in the enclosure wall.

Alternatively, the chassis can be regarded as an enclosure in which the single motor assembly 102 drives a pair of radiator diaphragms. The chassis can thus be constituted by a cabinet or other enclosure of any suitable shape and construction in which a motor unit (which could be a conventional electro-acoustic transducer) has no radiating surface exposed to the outside, but which is coupled to one or more additional radiators.

Figure 15:
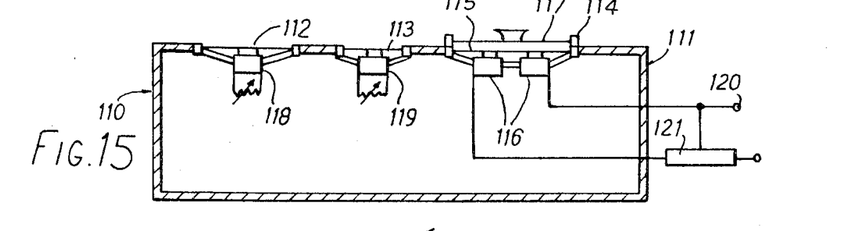
FIGS. 15 and 16 are sectional side views of a loudspeaker system embodying the invention and of a modification thereof respectively.

The loudspeaker device 110 of the invention shown in FIG. 15 comprises a cabinet or enclosure 111, which may be of conventional construction, mounting three loudspeaker units 112, 113 and 114 at apertures in one major wall. The diaphragms of the units 112 and 113 are pneumatically driven by the unit 114 which has a diaphragm 115 driven by a plurality of electro-mechanical transducers 116, and a passive radiator diaphragm 117, provided with an outwardly flaring conical center piece, the diaphragms 115 and 117 being coupled together by the air within a sealed chamber between them.

The diaphragms of the units 112 and 113 carry the moving coils of electro-mechanical transducers 118, 119 respectively, which can be used to supply or receive signals for damping or control purposes. The coils of the electro-mechanical transducers 118, 119 can instead or as well be supplied with signals within respective frequency band widths selected from the input signal to be reproduced as sound by the device as a whole. In this way each of the units 112, 113 receives both a pneumatic input covering the entire frequency range to be reproduced, and an electrical signal in a lesser frequency range therewithin.

As schematically shown in FIG. 15, a full frequency range audio input at 120 is supplied directly to the transducer 116 through a multi-section filter means 121. Transducers 118, 119 are pneumatically coupled. It will be understood that the voice coil formers of the electromechanical transducers of FIG. 15 carry as many separate coils as are required.

Transducers 118 and 119, like those in a number of other of the disclosed embodiments, are variably loaded.

Figure 16:
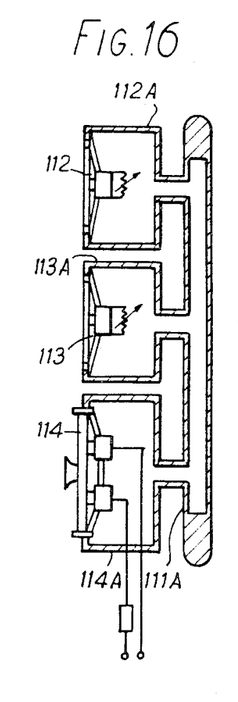

The units 112, 113 and 114 and the associated electrical arrangements can be employed with different enclosure means from the enclosure 111 shown in FIG. 15. Thus as shown in FIG. 16, the units, indicated by the same reference numerals, are mounted in respective enclosures 112A, 113A and 114A. The interiors of these enclosures are in communication by way of a duct 111A which may be flexible but which may be constituted by a rigid tube or tubes by which the enclosures can be suitably located for use. The duct 111A can for example comprise a pair of telescopically related tubes with spring means acting between them so that their ends can be urged into engagement with opposed walls or between a ceiling and a floor. The connections between the duct and the enclosures can be such as to permit selection of a desired orientation of each enclosure to the duct.

The relative sizes of the transducer diaphragms, their weights, their form, their suspension, the voice coil size, or weight or impedance, as well as the load values applied to the voice coils or the field strength of the associated magnet systems, will determine the frequency ranges handled by each of the pneumatically operated transducers. In this and various other embodiments of the invention, these factors are distinctively different among the various speakers, with the result that the frequency ranges of the various speakers will be different, although they may overlap. Thus the driven speaker may have a full frequency range, while the pneumatic one or ones may correct e.g. the base or the top. The pneumatic speaker or speakers control the acoustical characteristics of the enclosure or cabinet, to improve efficiency at specific frequencies, which can be narrow bands or wide bands.

Figure 17:
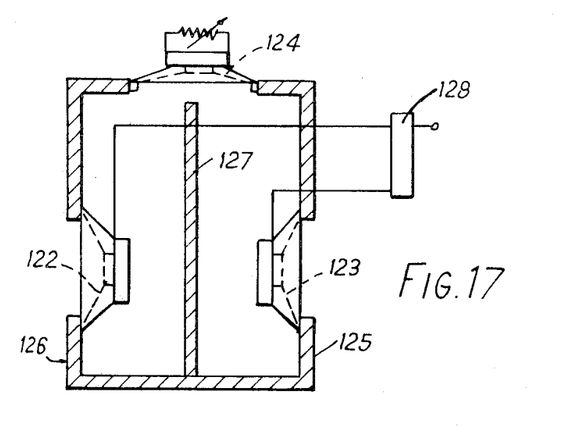
FIGS. 17 to 19 are like views of three further loudspeaker systems embodying the invention.

In the loudspeaker system 126 of the invention shown in FIG. 17, three loudspeaker diaphragms 122, 123 and 124 are mounted each in a respective wall of an enclosure 125. An internal baffle 127 provides substantial acoustic separation between the diaphragms 122 and 123 but allows each to be in communication with the diaphragm 124. The diaphragms are in this system provided by conventional loudspeaker units but one or more electro-acoustic transducers of the present invention can be used, and extra coils on the voice coil former are required if control signals are to be applied in addition to signals to be reproduced.

Figure 18:
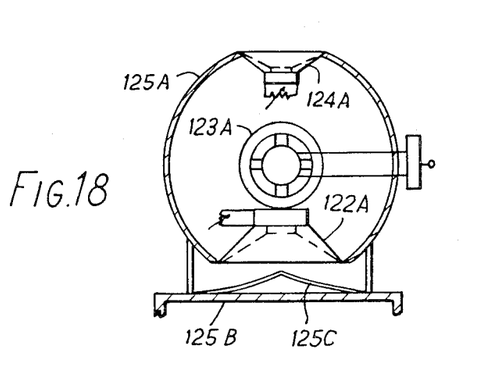

Pneumatically coupled diaphragms 122A, 123A and 124A can be mounted in a spherical or near spherical enclosure 125A instead of in a rectangular cabinet, as shown in FIG. 18. The largest diaphragm 122A is mounted in diametrically opposed relationship to the smallest 124A, and the diaphragm 124B of intermediate size has its axis perpendicular to this diameter. Of course other arrangements are possible and in particular the single intermediate diaphragm may be replaced by a plurality of diaphragms and equiangularly spaced around this diameter. The enclosure 125A can be employed in any desired orientation and may be positioned as shown on a base 125B which may be an electrically and/or pneumatically associated cabinet, with an appropriately shaped reflector 125C spaced from the lowermost diaphragm.

Figure 19:
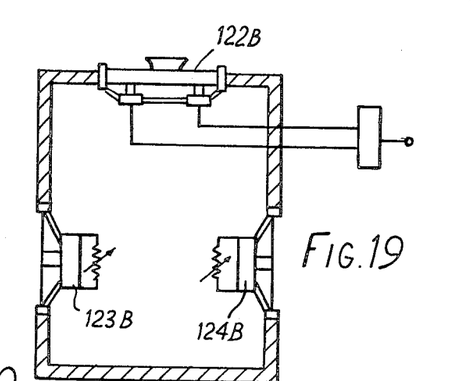

FIG. 19 shows another rectangular cabinet arrangement, but with the various diaphragms 122B, 123B and 124B arranged differently from FIG. 17.

The signal supply arrangements provided for the system of FIG. 15 can be employed with those of FIGS. 16 to 19 and there may be provided also as shown in FIGS. 17 to 19, switching means 128, 128A, 128B to enable the user to select which of the units is to function as the motor unit.

In any loudspeaker system of the invention, the physical positioning of the various diaphragms is chosen with reference to the phase differences introduced by the transmission of sound between them and the frequency range which it is intended that the outwardly radiating diaphragm or diaphragms should handle. The motor diaphragm can but need not itself have a surface exposed to the exterior of the enclosure.

The use in accordance with the invention of the signals obtained from an electro-acoustic transducer operated by a pneumatically driven diaphragm is now further described with reference to FIGS. 20 and 21.

Figures 20, 21, 22, 23:
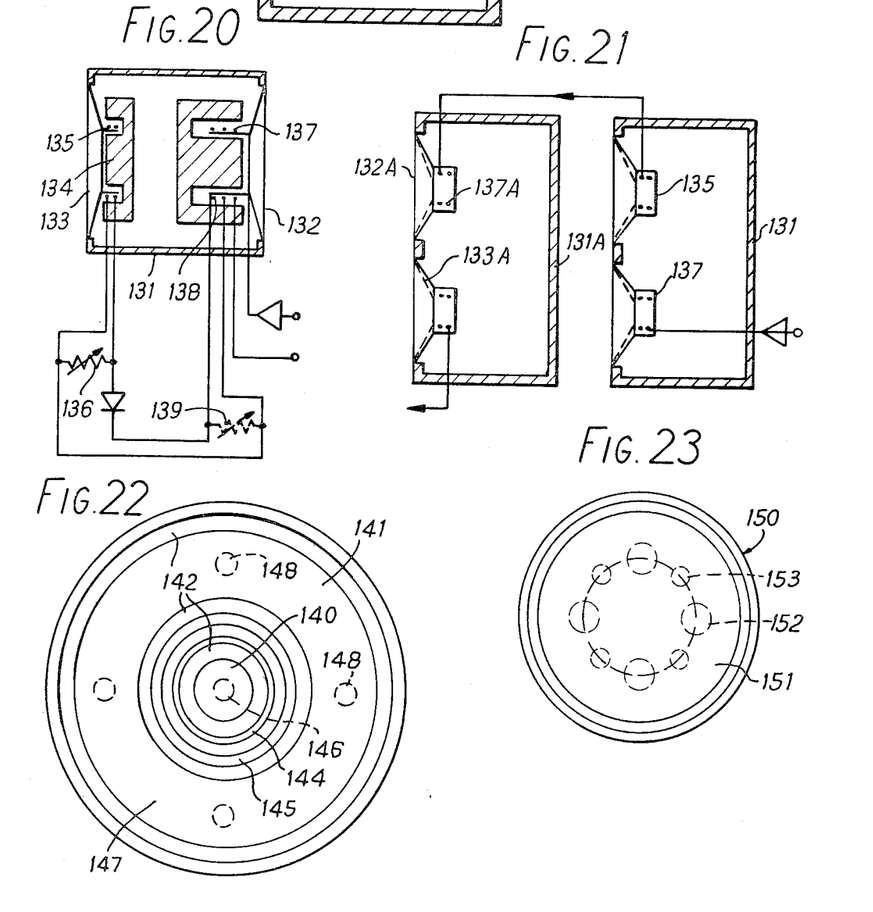
FIGS. 20 and 21 are like views of further loudspeaker systems embodying the invention.
FIGS. 22 and 23 are respectively front views of a further electro-acoustic transducer embodying the invention and a modification thereof.

The loudspeaker system illustrated in FIG. 20 comprises an enclosure or cabinet 131 mounting at apertures in the wall thereof an electrically driven electro-acoustic transducer or loudspeaker unit 132 and also an active additional diaphragm 133 equipped as shown with a magnet system 134 and a voice coil 135 which is not supplied with the signal to be reproduced in the form of sound.

The system is not limited to the use of any particular number of either electrically driven or pneumatically driven units in a cabinet, and one or more pneumatically driven diaphragms without associated electro-mechanical transducers can be provided. The additional radiator 133 of course has the inner side of its diaphragm exposed to the interior of the cabinet 131 to receive the sound pressure variations radiated by the inner side of the diaphragm of the motor unit 132. The additional radiator consequently vibrates in sympathy with these sound vibrations and its outer side transmits sound to the listener. The voice coil 135 of the additional radiator 133 will have an electric current generated in it because of the permanent magnet when diaphragm movements are induced by the sound vibrations.

As schematically shown, the electrical output signal of the additional radiator 133 can be employed one or both of two ways. The signal can thus for example be applied to effect damping of the radiator diaphragm, and/or to apply damping control to be selectively variable. In the illustrated example, the ends of the radiator coil are connected across a variable resistor 136. As will be readily understood, the greater the resistance setting of the variable resistor, the smaller will be the current flow in the circuit, and the consequent damping of the movement of the additional radiator diaphragm. With minimum resistance in the circuit, damping reaches a maximum. This part of the circuit therefore allows a variable control of the damping of the auxiliary radiator. The loudspeaker 132 is not a conventional loudspeaker but has in addition to the normal speech coil 137, at least one auxiliary coil 138 to which is applied the rectified voltage across the variable resistor. The output of the auxiliary radiator coil can thus be applied to the damping control of the movement of the diaphragm of the powered unit, this effect also being rendered adjustable by means of a variable resistor 139 included in the circuit. A third coil (not shown) can be provided on the loudspeaker 132 for reception of a d.c.

signal, preferably selectively adjustable, from the additional radiator or an external source, for the purpose of imposing a neutral position for the diaphragm which is different from that which the diaphragm would otherwise occupy.

As far as FIG. 20 is concerned, the object of providing the additional radiator with the electro-mechanical transducer constituted by the coil 135 and magnet 134 is thus to use the voltage generated in the coil 135 as indicative of the pressure variations at any time within the associated enclosure. This voltage can be used as a reference for further control either of the power fed into the active loudspeaker voice coil 138 or to the rest position of its diaphragm.

The voltage generated in an electro-acoustic transducer associated with a pneumatically driven diaphragm can be used additionally or instead to drive a further loudspeaker unit. As shown in FIG. 21, the electrical output of the coil 135 is taken to the voice coil 137A of a loudspeaker unit 132A mounted in a second enclosure 131A, which also mounts a diaphragm 133A pneumatically coupled with the diaphragm of the unit 132A. The drive to the loudspeaker system of the enclosure 131A is thus electrical but the electrical signal is obtained through a pneumatic coupling in the enclosure 131. The system comprising the two enclosures 131 and 131A can of course be extended by addition of further enclosures, and the enclosures can be in adjacency or physically spaced. Switching means can be provided to permit selection as to which of the enclosures receives the original signal input.

It will be noted from FIGS. 3 to 16 and 21, that the plural diaphragms face the same way. This is a preferred feature of the present invention.

It is to be understood that the provision of pneumatically driven diaphragms in accordance with the present invention is not confined to loudspeaker systems concerned only with the reproduction of signals at the lower end of the audio frequency range. The additional diaphragms of the invention can be employed in conjunction with loudspeaker units which handle either the entire audio frequency range, or any selected part of it.

The or each electro-acoustic transducer unit and the or each additional radiator of the loudspeaker systems described, or of conventional systems, can be constructed with a diaphragm formed conventionally from sheet material. The diaphragm design is preferably such as to minimize weight and aerodynamic resistance to movement and to maximize rigidity and thus resistance to distortion in use.

An electro-acoustic transducer unit which can replace both the loudspeaker unit and the additional radiator in the system of FIG. 20 is schematically illustrated in the frontal view of FIG. 22. A circular driven diaphragm 140 is surrounded by an annular diaphragm 141, the two diaphragms being mounted by suspension 142 from a common chassis or from respective independent chassis 144, 145 as shown.

The inner diaphragm 140 is shown in FIG. 22 as having a single central voice coil 146 but a plurality of such speech coils can be carried by the diaphragm. An electro-acoustic transducer unit 150 with a diaphragm 151 having plural voice coils is shown in frontal schematic view in FIG. 23; this can be employed either as a loudspeaker or as an additional radiator, conveniently in conjunction with an annular diaphragm surrounding it, as a replacement for the inner unit of FIG. 22. In order to distribute the motor function so as to minimize stress in its diaphragm 151, the plurality of voice coils 152 are equiangularly spaced around a circle concentric with the diaphragm axis. The circle is preferably of a greater radius than the average of the inner and outer radii of the diaphragm. Between each adjacent pair of voice coils, an electromagnetic damping or braking device 153 can be positioned as shown; the nature and function of these damping devices is further described below.

The annular diaphragm 141 of FIG. 22 can function as an additional radiator either with or without associated electro-mechanical transducers. If the diaphragm 141 is provided with voice coils, these are preferably located, as shown in FIG. 22, equiangularly spaced around a circle 147 which is concentric with its axis and of a radius which is the average of the inner and outer radii of the diaphragm. Four such voice coils 148 can be provided as shown but any other suitable number can be fitted instead. The outer unit of FIG. 22 can be used either as a loudspeaker or as a radiator unit independently of an inner unit.

Figure 24:
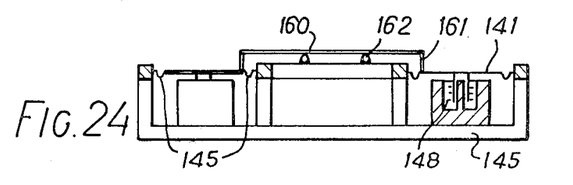
FIG. 24 is a cross-section through a further embodiment of a transducer unit of the invention.

As schematically shown in cross-section in FIG. 24, the annular diaphragm 141 of the outer unit of FIG. 22 can carry a circular additional diaphragm 160 by means of a very short sleeve 161 extending between the outer edge of the additional diaphragm and the inner edge of the annular diaphragm. The sleeve 161 may be apertured as shown at 162, to facilitate pressure equalization on the two sides of the diaphragm.

Figure 25:
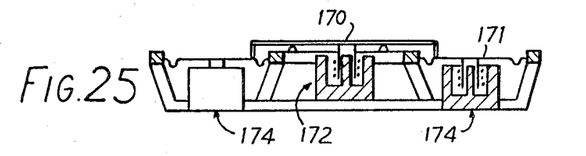
FIG. 25 is a modification of the transducer unit shown in FIG. 24.

Alternatively, in a modification of the unit of FIG. 24 shown in FIG. 25, an additional diaphragm 170 carried by an annular diaphragm 171 in the same way as the additional diaphragm 160 is carried by the diaphragm 141 in FIG. 24 is provided with an electro-mechanical transducer 172. The transducer 172 cooperates with electro-mechanical transducers 174 associated with the annular diaphragm 171, either to drive the two diaphragms when the unit is used as a loudspeaker or to generate an electrical output when the unit is pneumatically driven. The transducers 174 are preferably positioned in the same way as described in connection with FIG. 22.

To reduce manufacturing costs, it is preferred to employ a modular production system employing a minimum of standardized parts which can be assembled together in a variety of different ways to produce any desired one or more of a range of transducers suited to any requirements. For example, it will be evident that the units of FIGS. 22 to 25 can all employ identical electro-mechanical transducers, the required driving force or signal generating capacity being obtained by fitting the voice coils of one or more of these standardized transducers to a selected diaphragm of a few standardized diaphragms each suspended in its associated chassis either alone or in association with one or more other diaphragms. Also, the diaphragms can be used to support other diaphragms which may or may not be connected to respective electro-mechanical transducers.

Although the diaphragms of FIGS. 22 to 25 have all been shown as planar, other forms of diaphragm can be employed either directly or as part of a diaphragm assembly as shown in FIGS. 24 and 25.

Figure 26:
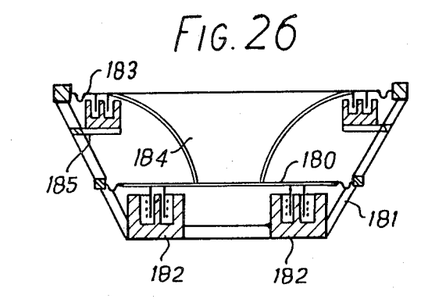
FIG. 26 is a sectional side view of a further embodiment of electro-acoustic transducer in accordance with the invention.

An electro-acoustic transducer with another form of diaphragm assembly is shown in the sectional side view of FIG. 26. A circular diaphragm 180 at the lower part of the chassis 181 as shown is driven by a plurality of electro-mechanical transducers 182. The chassis extends outwardly beyond this diaphragm 180 to mount a second generally frusto-conical diaphragm 184 by means of a conventional annular suspension member 183 having an annular corrugation or groove. The diaphragm 184 is connected at its narrower end with the diaphragm 180 so as to be concentric therewith. The diaphragm 180 could of course be annular if preferred and as it functions primarily to support the sound radiating diaphragm 184, it may be apertured. The diaphragm 184 could have a straightedge frusto-conical form instead of the curved sides illustrated. The unit of FIG. 26 is shown as having electro-magnetic damping or braking means 185, of a kind to be described in detail later, carried at the outer edge of the diaphragm 184.

Figure 27:
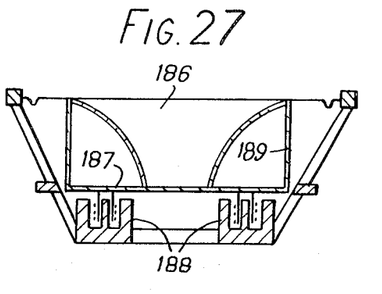
FIG. 27 is a sectional side view of an electro-acoustic transducer which is a modification of that shown in FIG. 26.

FIG. 27 is a sectional side view of an electro-acoustic transducer which resembles that of FIG. 26 in having a main sound radiating diaphragm 186 carried by a circular diaphragm 187 driven by electro-mechanical transducers 188. A sleeve 189 however extends between the outer edges of the diaphragms 186, 187 concentrically with the transducer axis. The sleeve 189 serves to connect the two diaphragms 186, 187 together.

Figure 28:
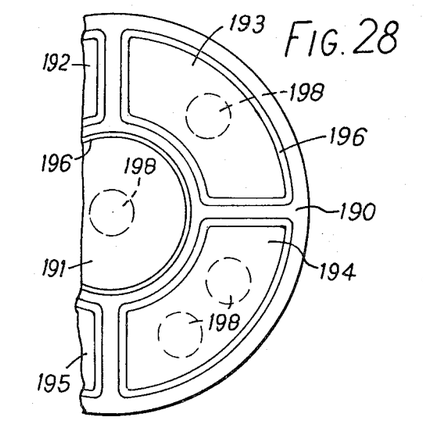
FIG. 28 is a partial front view of a further loudspeaker unit embodying the invention.

The loudspeaker unit of the invention shown in partial front view in FIG. 28 comprises a single chassis 190 suspending five separate diaphragms. A first diaphragm 191 is a central circular diaphragm surrounded by the remaining four, which are part-annular diaphragms 192, 193, 194, 195. These part annular diaphragms may be identical as shown, but could have different angular dimensions. The annular area round the central diaphragm 191 could of course be subdivided in other ways, for example so as to support three instead of four part-annular diaphragms. Each diaphragm is suspended at its periphery by suspension means 196 which may be conventional and each carries one or more voice coils 198 associated with respective permanent magnet means carried by the chassis 190. As shown, the outer diaphragms can be provided with either one or two voice coils but two is not necessarily an upper limit. The unit of FIG. 28 is thus a modification of that of FIG. 22, employing a single chassis and having the outer annular diaphragm divided.

The loudspeaker unit of FIG. 28 can have a central aperture instead of a built-in central diaphragm 191. The aperture can remain unoccupied or can accommodate a separate loudspeaker unit for example a pressure-type unit or a pneumatically driven diaphragm as previously described. One or more of the diaphragms 191 to 195 can be used as an auxiliary radiator with or without one or more associated electro-mechanical transducers.

Figure 29:
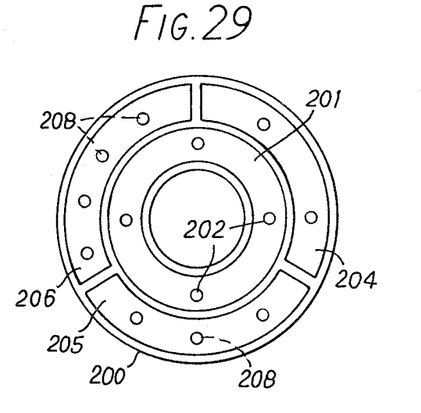
FIG. 29 is a front view of a still further loudspeaker unit embodying the invention.

A further exemplary loudspeaker unit in accordance with the invention is shown in front view in FIG. 29 as having a chassis 200 defining a central circular aperture concentrically surrounded by two annular diaphragm arrays of which the inner comprises a single annular diaphragm 201 driven by four equiangularly spaced electro-mechanical transducers with voice coils 202. The outer diaphragm array comprises three arcuate diaphragms 204, 205, 206 of equal area but driven respectively by two, three and four electro-mechanical transducers with speech coils 208. The concentric arrangement of the loudspeaker of FIG. 29 can be modified as to the number and areas of the diaphragms and the number and positioning of the speech coils they carry. There could be a single annular outer diaphragm and a divided inner annular diaphragm array.

It will be evident from the examples given that a variety of such loudspeaker units with different diaphragm configurations can be produced in accordance with the invention. The units need not be externally circular but could be elliptical or have some other desired shape.

As compared with conventional loudspeaker units of the same overall dimensions but having a single diaphragm, the illustrated units provide the advantage that the distance between the suspension and the or each speech coil of each diaphragm is less, so that the tendency of the diaphragm to bend in use because of the restraints imposed by the suspension is diminished. Moreover the use of one, two or more speech coils for a single diaphragm renders it possible to provide only a single speech coil/magnet assembly for use with a variety of loudspeakers and diaphragm sizes.

Moreover, the invention facilitates the achievement of optimum damping and related dynamic characteristics, and maximum transformation of operational electro-acoustic energy. Harmonic distortion is minimized. Optimum ratios of size to power handling capacity and to the lowest frequency that can be successfully reproduced, can be realized. Moreover, there are the indirect advantages that smaller enclosures and lower driving power can be employed. In economic terms, the total costs involved in the production of one decibel of clean sound can be substantially lower than in conventional systems.

The multi-diaphragm loudspeaker structure is well suited for use in a multi-channel amplifier and sound reproduction system, the speech coil or coils of each diaphragm being supplied with a signal in a different respective part of the audio frequency range. The diaphragm weights can advantageously be preselected so as to respond preferentially to the particular frequency range with which they are supplied, or, as previously pointed out, frequency selectivity can also be achieved by varying the diaphragm weight, the voice coil impedance, the load applied to the voice coil, or the suspension of the diaphragm; and this frequency selectively can be made sufficient for the various diaphragms to radiate only sounds within a selected frequency range even though an input signal of wider range is supplied. Similar selective diaphragm weighting and loading arrangements can of course be made for diaphragms of separate loudspeaker units if desired. In this way a mechanical tone compensation can be achieved.

As briefly mentioned in connection with the units of FIGS. 23 and 26, electro-acoustic transducers embodying the invention can incorporate magnetic or hydraulic suspension and centering means. Such means can be employed as damping or braking means or can replace or supplement conventional diaphragm suspension means. The suspension means 153 and 185 of this kind shown in FIGS. 23 and 26 comprise coils carried by the diaphragm in the same manner as voice coils, each coil being received in a respective gap in a permanent magnet structure again in the same way as a voice coil, or a signal generating coil of an auxiliary radiator. Thus an electro-magnetic suspension system can comprise a plurality of coils as shown in FIGS. 23 and 26 carried at the periphery of a loudspeaker diaphragm at equiangularly spaced positions say 45° to 90° apart. Although shown in FIG. 23 as having a smaller diameter than the voice coils 152, the suspension coils 133 can be larger or of the same diameter, and the suspension means can correspond to the electro-mechanical transducers including the coils 152.

Figures 30, 31, 32, 33, 34:
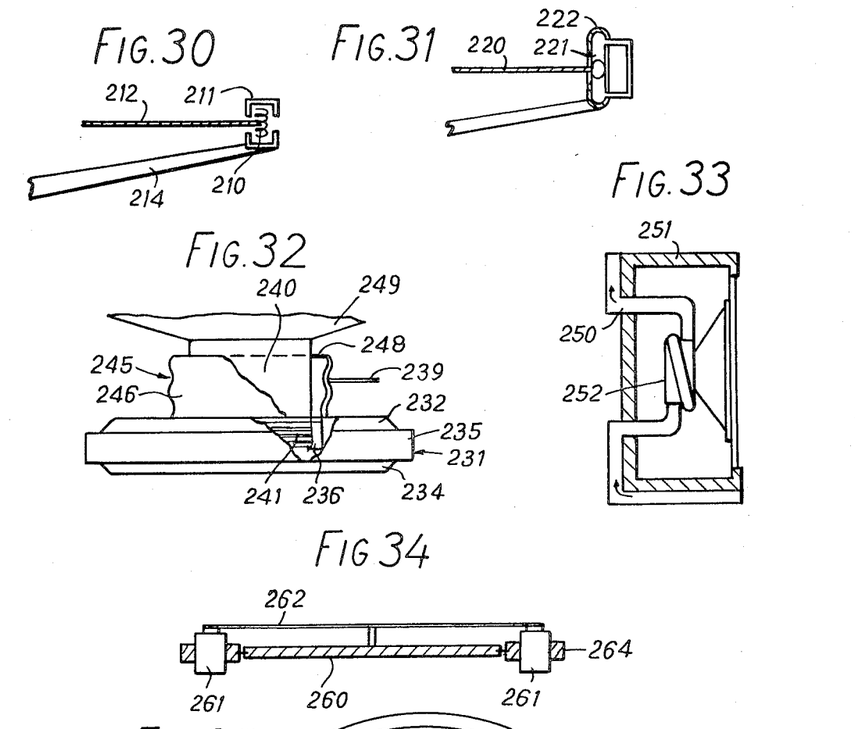
FIG. 30 shows an alternative configuration of diaphragm assembly for use in the transducers of FIGS. 20 to 29.
FIG. 31 shows a further alternative configuration of diaphragm suspension for use in the transducers of FIGS. 20 to 29.
FIG. 32 is a schematic partial side view of a further embodiment and electro-acoustic transducer in accordance with the invention.
FIG. 33 shows schematically means for dissipating heat developed in transducers in accordance with the invention.
FIG. 34 is a side elevation of a further embodiment of an electro-acoustic transducer in accordance with the invention, in which the diaphragm is mechanically coupled to electro-acoustic transducer means.

FIG. 30 shows an alternative configuration of coil 210 and magnetic structure 211 at the edge of a diaphragm 212 by which the diaphragm is suspended in a chassis 214.

In an alternative arrangement shown in FIG. 31, a diaphragm 220 carries elements 221 received in cylinders 222 for sliding axially of the diaphragm, the sliding movement being damped hydraulically or pneumatically. Electro-magnetic suspension means can be combined with hydraulic or pneumatic suspension means in a single unit if desired.

The suspension means for a voice coil in an electro-mechanical or an electro-acoustic transducer of the invention can comprise a tubular member of resiliently variable length surrounding the voice coil former and secured at one end to the magnet means and at the other to the former. The tubular member can comprise a bellows; if it does not taper in toward the former it can be attached thereto by a flange which may itself accommodate relative axial movement between the former and the magnet means.

An electro-acoustic transducer incorporating such a suspension can be manufactured as a separate item, for use as a component of the modular electro-acoustic transducer system already described.

FIG. 32 is a schematic partial side view of a electro-mechanical transducer incorporating this kind of suspension, and comprising a permanent magnet structure 231 comprising upper and lower plates 232, 234 and pole piece 235 received between them. The magnet structure 231 defines an annular gap 236 opening upwardly through the upper plate 232. A tubular former 240 carries a voice coil 241 comprising thin metal wire wound helically around the former at its lower end. A mounting means 245 comprises a generally tubular peripherally corrugated portion 246 of flexible material with an annular flange 248 at one end. The other end of the tubular portion 246 is fixedly secured to the upper surface of the top plate 232 around the annular gap 236, and the inner end of the flange 248 is fixedly secured to the former 240.

Passage of electric current through the coil 241 will cause axial movement of the former 240 and the tubular portion 246 of the mounting means 245 will permit this because of the flexibility of the material and its corrugations. The tubular portion 246 functions in effect as a bellows and provides the required suspension function. The annular flange 248 can be planar, or annularly corrugated so as to permit its inner periphery to be spaced axially from its outer periphery, so that the flange also contributes to the suspension.

Although the tubular and annular portions 246, 248 are shown as being integrally formed, it is of course possible also to construct them as separate members connected together at the outer edge of the annular flange, which may be apertured; and the upper end of the tubular bellows portion.

The assembly as so far described will function as an electro-mechanical transducer, in as far as a flow of current through the coil 241 will cause axial movement of the former 220, whilst axial movement of the former will induce a current in the coil. To make the assembly effective as an electro-acoustic transducer, means has to be provided for converting the axial movements of the former 240 into sound vibrations, or vice versa. This is done by securing a diaphragm to the free end of the former 240. The diaphragm may be as shown a conventional frusto-conical diaphragm 249 but may have any desired configuration. The diaphragm can be supported at its outer edge in any suitable manner within a chassis (not shown) connected to the magnet structure 111.

The tubular member 246 will not of itself apply any centering influence to the former 240, and such control can be supplied by means extending radially from it to the magnet structure or to a chassis to which this is secured. The centering means can comprise a conventional annularly corrugated member or three or more radially extending filaments 239 or strips extending from the flange 238 or from an intermediate position along the member 246, as shown, to the magnet structure 231 or to the chassis supporting the diaphragm 249.

It is of course possible within the invention to select any one or to combine any two or more of conventional suspension means and of the suspension arrangements described herein for use in mounting a diaphragm or a coil former in an electro-mechanical or electro-acoustic transducer unit embodying the invention. By appropriate selection, it will be seen to be possible to provide a mounting arrangement for a diaphragm in an electro-acoustic transducer which approaches the ideal of a free piston-like movement, without deformation, and without in any way inhibiting movement even for large excursions at high power.

Particularly where large power outputs are concerned, considerable heat can be generated in the magnet system of a loudspeaker unit, and the invention accordingly provides means for dissipating this heat. The magnet structure may be provided with fins for example to enlarge the surface area from which heat can be radiated, but as radiation can normally be effected only into a sealed chamber which may not be of large size, it is preferred to provide a thermally conductive path to the exterior of the cabinet in which the loudspeaker unit is mounted. As shown in FIG. 33, the conductive path can be constituted by a tube 250 with an end opening externally of a cabinet 251 so that external air is in contact with the tube and with a loudspeaker magnet structure 252. Preferably however as shown the tube 250 is in contact with the magnet structure between its ends, both of which communicate with the cabinet exterior so that heat can be carried away by a flow of air through the tube.

Instead of the free air circulation of FIG. 33, forced air circulation could be provided, or air or another cooling fluid could be circulated within a closed system.

In the transducer unit schematically shown in FIG. 34 the diaphragm 260 is mechanically coupled to a plurality of electro-mechanical transducer means 261 located laterally of the diaphragm. The mechanical coupling means comprises a plurality of struts 262 radiating from a central position on the diaphragm to respective electro-mechanical transducers 261 positioned around the periphery of the diaphragm. The magnets of the electro-mechanical transducers 261 are held within concentric rings constituting a frame or chassis 264 of the unit. The diaphragm can be circular and the electro-mechanical transducers are preferably then four or more in number and equiangularly spaced around the diaphragm periphery. However, a non-circular diaphragm can be employed. It will be evident that as many peripherally located electro-mechanical transducers can be employed as are required to afford the power handling characteristics required.

Figure 35:
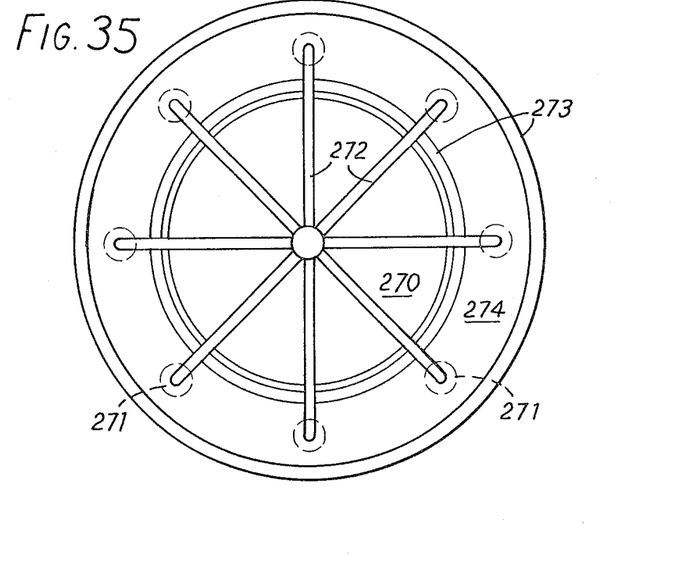
FIGS. 35 and 36 are respectively plan and sectional views of a further electro-acoustic transducer embodying the invention.
Figure 36:
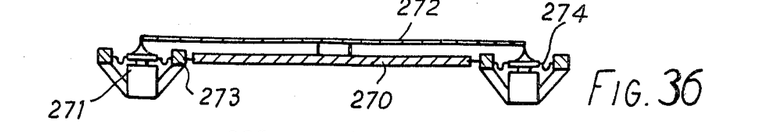

FIGS. 35 and 36 are respectively plan and sectional side views of a further electro-acoustic transducer in accordance with the invention in which a diaphragm 270 suspended within a chassis 273 is connected to a plurality of electro-mechanical transducers 271 by radial struts 272. These transducers are not however connected to the struts directly but to an annular diaphragm 274 supported in the chassis 273 and surrounding the diaphragm 270.

Figures 37, 38, 39, 40, 41:
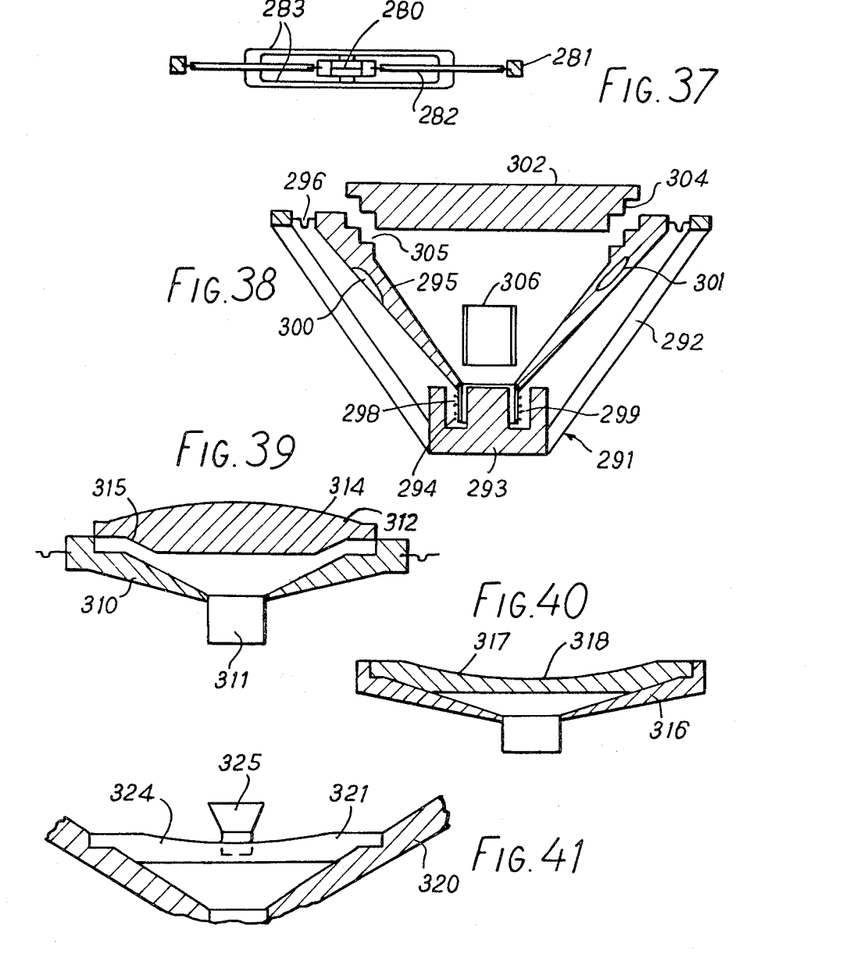
FIG. 37 is a view similar to that of FIG. 34, showing a transducer embodying the invention and having a different diaphragm location arrangement.
FIG. 38 is a sectional side view of a further loudspeaker unit embodying the invention.
FIGS. 39 to 41 are partial part-sectional side views each of a different modification of the loudspeaker unit of FIG. 37.

Although the central diaphragms in FIGS. 35 and 36 are mechanically connected to electro-mechanical transducers located around their peripheries, it is possible either instead or as well to locate electro-mechanical transducer means centrally in a chassis 281 and to connect this to an annular diaphragm 282 suspended around it as shown in FIG. 37. The transducer means 280 will be seen to comprise two electro-mechanical transducers positioned in alignment, the voice coils extending to opposite sides of the diaphragm 282 and each connecting to the diaphragm by a respective arrangement of struts 283. In general, whenever an electro-mechanical transducer is provided on one side of the diaphragm or frame in an electro-acoustic transducer embodying the present invention, a second such transducer can be opposed to it on the other side if desired; such opposing transducers need not necessarily be in alignment. For example the electro-mechanical transducers 271 of FIGS. 35 and 36 could be alternately on different sides of the annular diaphragm.

The mechanical connections from the electro-mechanical transducers in the units shown in FIGS. 34–36 to the internally located circular diaphragms need not necessarily be made at the diaphragm center but may be distributed over its area if preferred.

FIGS. 38–41 illustrate a preferred diaphragm structure and assembly method applicable to the electro-acoustic transducers of the present invention.

The electro-acoustic transducer unit or loudspeaker 291 shown in FIG. 38 comprises a chassis 292 to which is secured a permanent magnet structure 293 having an annular gap 294 between its pole pieces. The loudspeaker includes a diaphragm having two parts secured together in use but shown slightly spaced apart for purposes of illustration. A suspended outer portion 295 is generally frustoconical and is carried by the chassis 292 at its outer periphery by a suspension 296 which may be conventional. At its inner end, the diaphragm portion 295 carries a voice coil former 298, shaped as a short sleeve, with a voice coil 299 wound around this externally. The diaphragm portion 295 is not made of sheet material but is molded in three dimensions, from expanded polystyrene or other suitable material. To reduce its weight the diaphragm portion 295 can be provided with recesses 300. The portion 295 can itself be assembled from two moldings and can then include cavities 301.

The voice coil former 298 is received coaxially within the annular gap 294, and a centering device (not shown), which may be of conventional form, extends between the magnet structure 293 and the diaphragm portion 295, conveniently at or near the joint between the diaphragm portion and the former 298.

To complete the diaphragm, the central aperture is closed by a second diaphragm portion 302 which has the general form of a plug received at the outer end of the diaphragm portion 295. The two diaphragm portions can be secured rigidly together by means of suitable adhesive, and to facilitate this and correct a relative location of the two parts, the two parts are provided with interfitting annular steps 304, 305 respectively.

The loudspeaker can of course operate satisfactorily only if clearance between the voice coil former 298 and the voice coil 299 on the one hand and the permanent magnet structure 293 on the other hand is maintained at all times. It is therefore essential to center the former 298 within the magnet structure 293 during assembly whilst the diaphragm portion 295 is secured within the chassis 292 by means of the suspension 296 and by the centering means. The two-part structure of the diaphragm readily permits this to be done by way of a feeler or spacer 306 which is fitted into the annular gap between the central pole piece of the magnet structure 293 and the inner surface of the voice coil 298. The feeler 306 holds the diaphragm portion 295 in the correct relative location to the chassis 292 whilst the suspension 296 and centering means are fixed in place. It is then withdrawn. Only after this stage is the second diaphragm portion 302 added. Without the two-part structure, the feeler could not of course be removed, and could not therefore be employed.

The diaphragm portion 207 has a planar outer or radiating surface 308, but it is to be understood that both portions can be differently shaped. In FIG. 39 there is shown a diaphragm structure which again comprises a frustoconical portion 310 carrying a voice coil former 311 and shaped to receive at its outer end a second portion 312 providing an outer radiating surface 314, the second portion being shown spaced away from its position of assembly with the first portion. The radiating surface is convex, being outwardly domed, and the surface 315 over which the two diaphragm portions are secured by adhesive, instead of being in the form of annular steps includes a frusto-conical portion.

FIG. 40 shows a further modification, in which there is secured to an apertured diaphragm portion 316, a second portion 317 with a radiating surface 318 which is inwardly recessed or concave.

FIG. 41 shows another possible form for the diaphragm arrangement, in which a three-part diaphragm is employed. There is as before a generally frusto-conical portion 320 which is suspended in the chassis, and a second portion 321 received in the first portion after this has been mounted in the chassis, and after removal of the spacer member, which ensured that the position of the first portion was correct. The second portion 221 is not however received at the outer end of the frusto-conical portion 321 but at a position spaced between the outer end and the voice coil former 324. In general, it will be evident that the central aperture of the portion 320 need be no larger than is necessary for passage of the spacer 306 or other spacing means. The inner portion 321 has a recessed radiating surface 324, similar to that of FIG. 40. The third portion of the diaphragm comprises a central frusto-conical element 325, which can also be of molded form, but may instead as shown be of conventional sheet material.

The second diaphragm portions 302, 312, 318, 321 have been shown as being arranged to be received in different suspended diaphragm portions. It is however preferred, in keeping with the modular construction system for electro-acoustic transducers previously described, to provide one or more standardized suspended diaphragm portions such as portions 301, 310, 316 or 320, together with a selection of second portions 302, 312, 318, 321, any one of which can be secured to the suspended portion to give to the completed diaphragm described, the predetermined characteristics, in particular frequency response. A third diaphragm portion such as portion 325 could be optionally added to the selected second portion.

It will be appreciated that the two-portion diaphragm structures of FIGS. 38-41 can be employed as electrically driven motor diaphragms for pneumatic coupling to one or more other diaphragms, and generally in the various electro-acoustic transducer means of the invention.

It will be evident that the invention can be embodied in a variety of electro-acoustic transducer units other than as described, and that the units described can be modified in various ways.

In general, appropriate features of the various arrangements shown can be interchanged as desired.

I claim:

1. An electro-acoustic transducer means comprising:
   diaphragm means, said diaphragm means having an outer periphery and an internal aperture bounded by an inner periphery,
   rigid chassis means, said chassis means having a first portion extending around said diaphragm means outer periphery and a second portion disposed within said diaphragm means internal aperture and around which said diaphragm means inner periphery extends,
   first diaphragm suspension means, said first diaphragm suspension means extending between said diaphragm means outer periphery and said first portion of said chassis means,
   second diaphragm suspension means, said second diaphragm suspension means extending inwardly from said diaphragm means inner periphery to said second portion of said chassis means,
   electro-mechanical transducer means acting between said diaphragm means and said chassis means,
   means mounting said electro-mechanical transducer means within said chassis means second portion, and
   connecting means extending outwardly from said electromechanical transducer means to drivingly engage said diaphragm means.

2. The electro-acoustic transducer means of claim 1 wherein said diaphragm means is substantially planar.

* * * * *